(No Model.)
P. ROBINSON.
GATE.
No. 335,630. Patented Feb. 9, 1886.
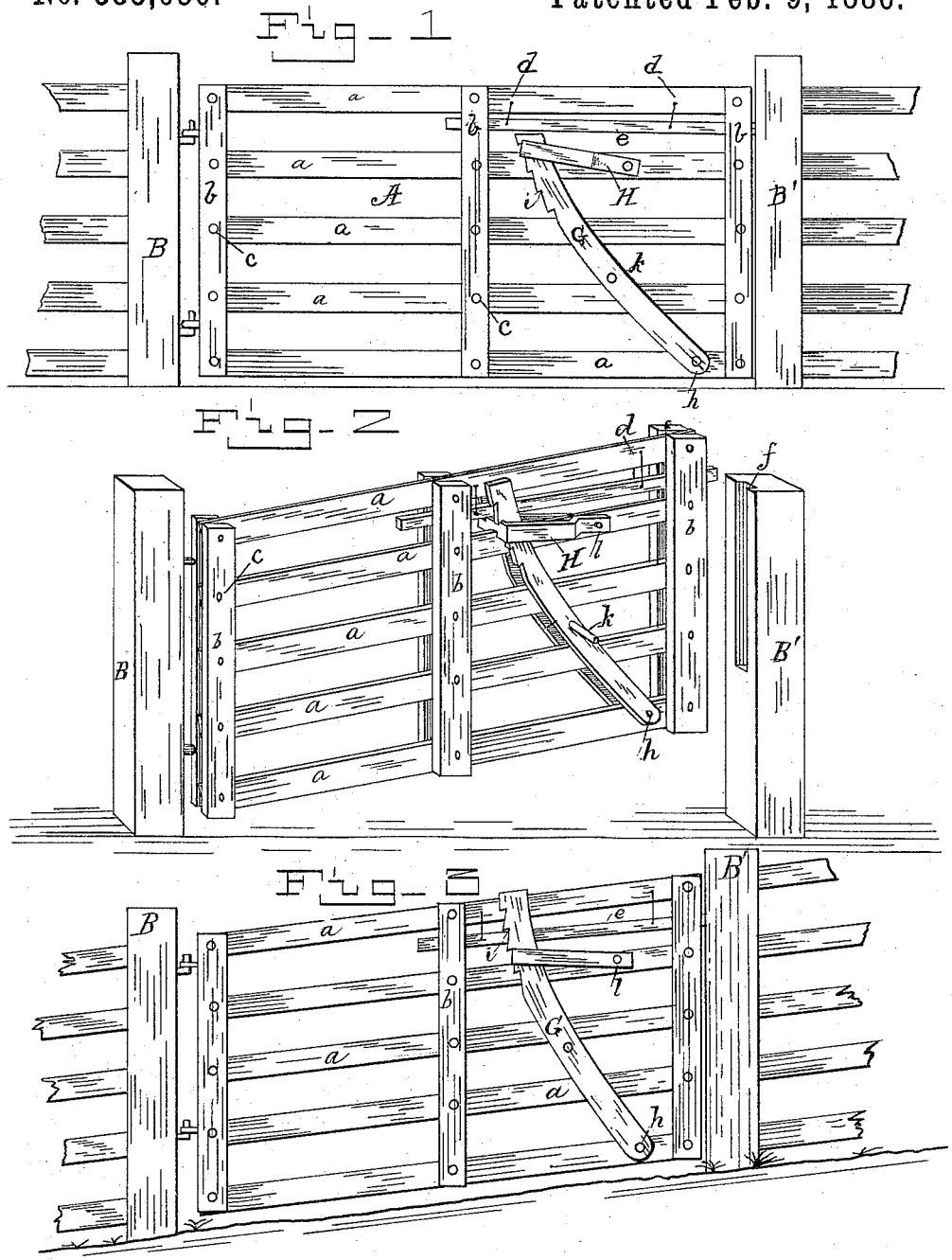
WITNESSES
M. C. Massie
W. H. Myers
INVENTOR
Peter Robinson
By Tyner & Walker
Attys

UNITED STATES PATENT OFFICE.

PETER ROBINSON, OF FARMLAND, INDIANA.

GATE.

SPECIFICATION forming part of Letters Patent No. 335,630, dated February 9, 1886.

Application filed October 21, 1885. Serial No. 180,528. (No model.)

*To all whom it may concern:*

Be it known that I, PETER ROBINSON, a citizen of the United States, residing at Farmland, in the county of Randolph and State of Indiana, have invented a certain new and useful Improvement in Gates; and I do hereby declare the following to be a full, clear, and exact description of the invention, such as will enable others skilled in the art to which it appertains to make and use the same.

My invention relates to an improvement in folding gates adapted to be used on level ground or on a hillside, and also to clear obstructions in the path of movement, such gates being constructed of horizontal bars loosely pivoted between vertical strips.

The object of my invention is to provide a gate of the class above mentioned with a brace and a clasp which, while strengthening it, will permit free movement of the bars upon their pivots, and will hold them in any desired position.

In the accompanying drawings, Figure 1 is a front elevation of a gate provided with my brace and clasp. Fig. 2 is a perspective view showing the gate held in a raised position by the brace and clasp. Fig. 3 is a front elevation of a gate provided with my improvement as used on a hillside.

Referring to the drawings, A represents the gate hinged to post B and latching into post B', as shown.

The gate is constructed of a series of bars, a, arranged horizontally and parallel between vertical strips b, disposed in pairs. Through the strips and bars are passed pivot-bolts c, on which the bars freely turn, allowing the gate to be folded up to a certain extent. Hung by wires d from the upper bar of the front panel is a latch, e, for taking into a groove or recess, f, in the front post, B', to secure the gate in its closed position.

Gates of this description are very useful, as when it is desired to mount a gate on a hillside its bars can be so folded as to make it conform to the incline of the ground, and when its path of movement is obstructed, as by snow, its lower bar can be elevated, thus permitting the gate to swing clear.

I am aware that gates have been heretofore constructed with a vertical notched bar pivoted to the lower horizontal bar, and engaging with a strap bolted to the upper horizontal bar of the gate, and adapted to hold the gate in a raised or lowered position. In this construction, however, the pivoted notched bar and the strap are on but one side of the horizontal bars, and therefore the former has not the function of a brace to the panel, and the strain exerted on the strap falls wholly on the bolts by which it is secured. By my invention I have provided the gate with a retaining-brace, which not only strengthens it, but which also serves, in connection with a clasp attached to one of the bars, to hold the gate to the desired shape.

G represents the retaining-brace, made of either wood or metal. It is constructed of two pieces, preferably slightly curved, as shown. These pieces are placed one on either side of the bars in a diagonal direction, their lower ends being loosely bolted, as at h, to the lower bar near the front end of the gate, while their upper ends pass through a clasp attached to one of the upper bars, and are provided with a series of notches, i. Passing through the brace between two of the bars is a rod, k, serving as a handle by which to operate the brace.

H represents the clasp, formed from a single piece of metal bent into the shape shown in the drawings, its closed end resting on top of the bar and its open end secured to the bar by a bolt, l. This clasp, as above stated, embraces the upper ends of the pieces constituting the brace, and binds them closely to the horizontal bars. As the notches of the retaining-brace engage with the closed end of the clasp, and that end rests on top of the bar, there is practically no strain on the bolt that secures the clasp.

It is obvious that by lifting on the handle k the gate may be folded as desired, and when so folded may be held in that condition by engaging one of the notches i of brace G with the clasp.

Having thus described my invention, what I claim as new, and desire to secure by Letters Patent, is—

The combination, with a folding gate of the class described, of a toothed brace constructed of two pieces arranged on opposite sides of the bars, and provided with a handle, and a clasp secured to one of the bars, the lower ends of the pieces composing the brace pivoted to the gate, and the upper ends embraced by and engaging with the clasp, substantially as described, and for the purpose stated.

In testimony whereof I affix my signature in presence of two witnesses.

PETER ROBINSON.

Witnesses:
OLIVER F. LUELLEN,
JOSEPH C. JONES.